(12) United States Patent
Davydov et al.

(10) Patent No.: US 7,600,265 B2
(45) Date of Patent: Oct. 6, 2009

(54) SYSTEM AND METHOD FOR APPLYING AN OMA DRM PERMISSION MODEL TO JAVA MIDP APPLICATIONS

(75) Inventors: Alexander Davydov, Tampere (FI); Guido Cugi, Helsinki (FI); Matthew Powell, Tampere (FI)

(73) Assignee: Nokia Corporation, Espoo (FI)

( * ) Notice: Subject to any disclaimer, the term of this patent is extended or adjusted under 35 U.S.C. 154(b) by 923 days.

(21) Appl. No.: 11/075,782

(22) Filed: Mar. 9, 2005

(65) Prior Publication Data
US 2006/0205385 A1  Sep. 14, 2006

(51) Int. Cl.
*G06F 21/00* (2006.01)
*G06F 7/04* (2006.01)
(52) U.S. Cl. ............................................. 726/29; 726/1
(58) Field of Classification Search ..................... 726/33
See application file for complete search history.

(56) References Cited

U.S. PATENT DOCUMENTS

| 5,014,234 | A  | * | 5/1991 | Edwards, Jr. .................. 726/33 |
| 5,883,954 | A  | * | 3/1999 | Ronning ....................... 705/52 |
| 5,883,955 | A  | * | 3/1999 | Ronning ....................... 705/52 |
| 6,446,211 | B1 | * | 9/2002 | Colvin ......................... 726/22 |
| 6,769,068 | B1 | * | 7/2004 | Brozowski et al. .............. 726/5 |
| 7,191,325 | B2 | * | 3/2007 | Zunke ............................ 713/1 |
| 7,340,438 | B2 | * | 3/2008 | Nordman et al. ............... 705/64 |
| 2002/0029351 | A1 | * | 3/2002 | Deng ........................... 713/201 |
| 2002/0077988 | A1 | * | 6/2002 | Sasaki et al. ................... 705/59 |
| 2004/0127196 | A1 |   | 7/2004 | Dabbish et al. |
| 2005/0021995 | A1 | * | 1/2005 | Lal et al. ...................... 713/200 |
| 2005/0060569 | A1 | * | 3/2005 | Uesugi et al. ................ 713/200 |
| 2008/0201782 | A1 | * | 8/2008 | Seo et al. ....................... 726/27 |

OTHER PUBLICATIONS

Implementation Best Practices for OMA DRM v1.0 protected MIDlets, Version 1.0, May 5, 2004, pp. 1-35.
International Search Report for PCT Application No. PCT/IB2006/000502.
Digital Rights Management. Version 1.0, Open Mobile Alliance, http://www.openmobilealliance.org/release_program/docs/DRM/V1_0-20040625-A/OMA-Download-DRM-V1_0-20040615-A.pdf.

* cited by examiner

*Primary Examiner*—Christopher A Revak
(74) *Attorney, Agent, or Firm*—Foley & Lardner LLP

(57) ABSTRACT

A system and method of applying a permission model to an application operating on a mobile electronic device. When an application is launched on the mobile electronic device, it is determined whether the mobile electronic device possesses execution rights for the application. If the mobile electronic device does not possess valid execution rights for the application, the application is closed. If valid execution rights for the application expire after the application has been launched, a system is provided to inform the user that the rights have expired. The application with expired rights is then closed, unless the user obtains a new and valid rights object for the application.

20 Claims, 5 Drawing Sheets

SYSTEM AND METHOD FOR APPLYING AN OMA DRM PERMISSION MODEL TO JAVA MIDP APPLICATIONS

FIELD OF THE INVENTION

The present invention relates to digital rights management and device management. More particularly, the present invention relates to use of permission models in electronic devices using JAVA MIDP technology.

BACKGROUND OF THE INVENTION

Open Mobile Alliance (OMA) Digital Rights Management (DRM) is a technology that allows control over the consumption of various media objects, such as ring tones, images, and other objects, by mobile terminals. DRM is a term used to describe a range of techniques that use information about rights and rights holders to manage copyright material and the terms and conditions on which the material is made available to users. More specifically, DRM involves the description, layering, analysis, valuation, trading, and monitoring of an owner's property rights to an asset. DRM covers the management of the digital rights to the physical manifestation of a work (e.g., a textbook) or the digital manifestation of a work (e.g., an Internet web page). DRM also covers the management of an asset whether the asset has a tangible or an intangible value. Current DRM technologies include languages for describing the terms and conditions for an asset, tracking asset usage by enforcing controlled environments or encoded asset manifestations, and closed architectures for the overall management of the digital rights.

In OMA DRM technology, control is exercised by supplementing each media object with a rights object. The rights object defines rules according to which the media object is consumed. With some adjustments, this technology can also be applied to Java Mobile Information Device Profile (MIDP) applications. MIDP provides the core application functionality required by mobile applications, including the user interface, network connectivity, local data storage, and application lifecycle management. This functionality is packaged as a standardized Java runtime environment and set of Java technology application programming interfaces (APIs).

Currently, OMA DRM is not used for the protection of Java MIDP applications. Before OMA DRM can be used for such protection, a system and method is needed for applying the OMA DRM permission model to applications. This includes both the selection of applicable permissions and the definition of rules for the enforcement of these permissions

SUMMARY OF THE INVENTION

According to the principles of the present invention, among permissions defined in OMA DRM specifications, only "execute" is applied to MIDlets, which are applications which operate on mobile devices. Any of three constraints (together or separately) defined in the OMA DRM specifications can be used in conjunction with the "execute" permission. Permission enforcement occurs generally as follows: Permissions and constraints are checked each time a MIDlet is launched. If execution rights are found to be invalid, a MIDlet is not permitted to be launched. In the event that execution rights expire while the MIDlet is still running, the MIDlet is closed and the user is notified with a special prompt and/or the application at issue is closed. The user may also be provided with the opportunity to request a new rights object. In this case, the MIDlet is put into a paused states until rights arrive.

With the present invention, usage of OMA DRM is possible for the protection of MIDlet suites, which is not possible with conventional systems. Additionally, the present invention also ensures that no application is permitted to continue operating after its execution rights have expired.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
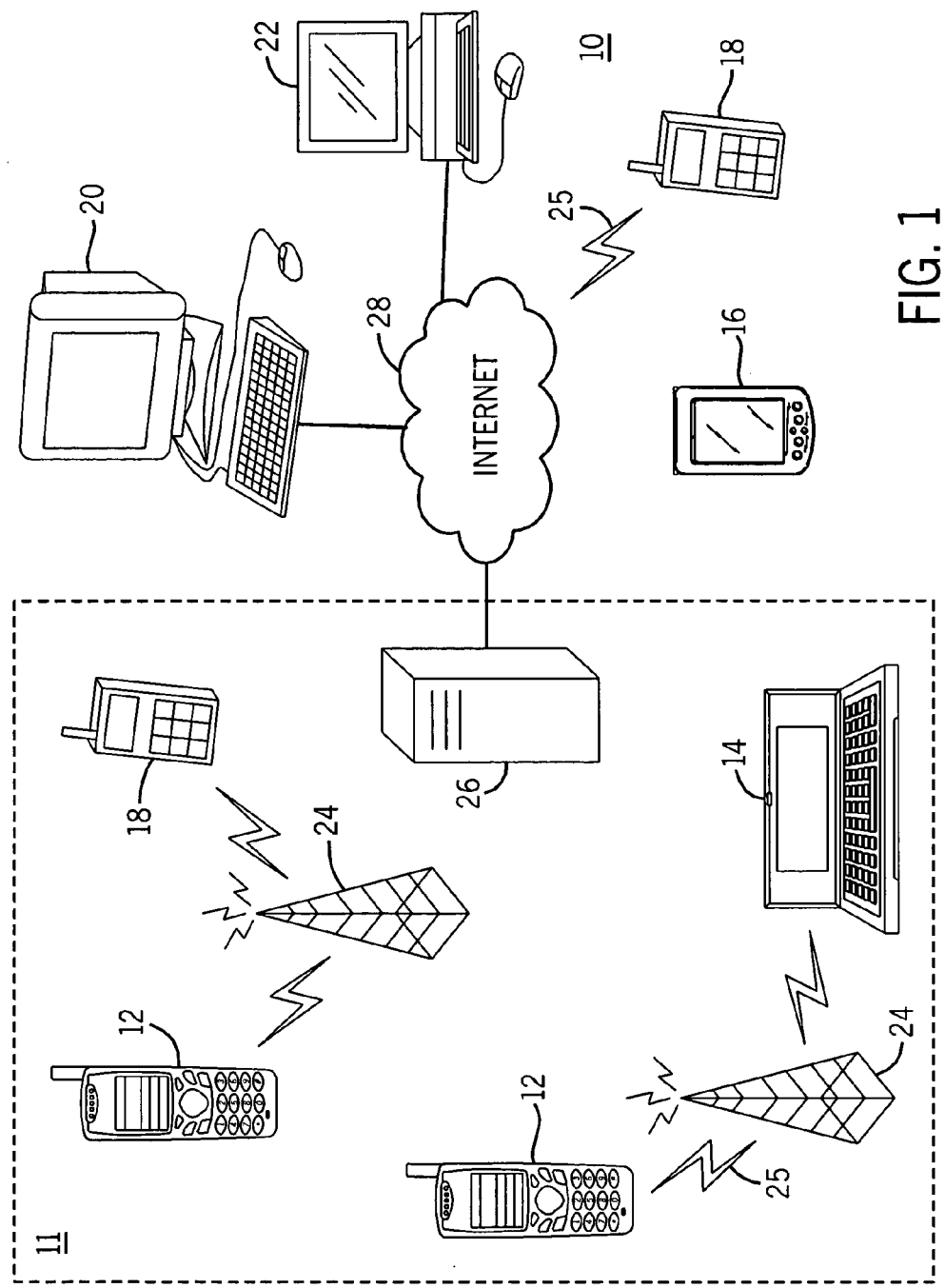
FIG. 1 is an overview diagram of a system within which the present invention may be implemented.

FIG. 1 shows a system 10 in which the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 1 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a mobile telephone 12, a combination PDA and mobile telephone 14, a PDA 16, an integrated messaging device (IMD) 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28.

The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
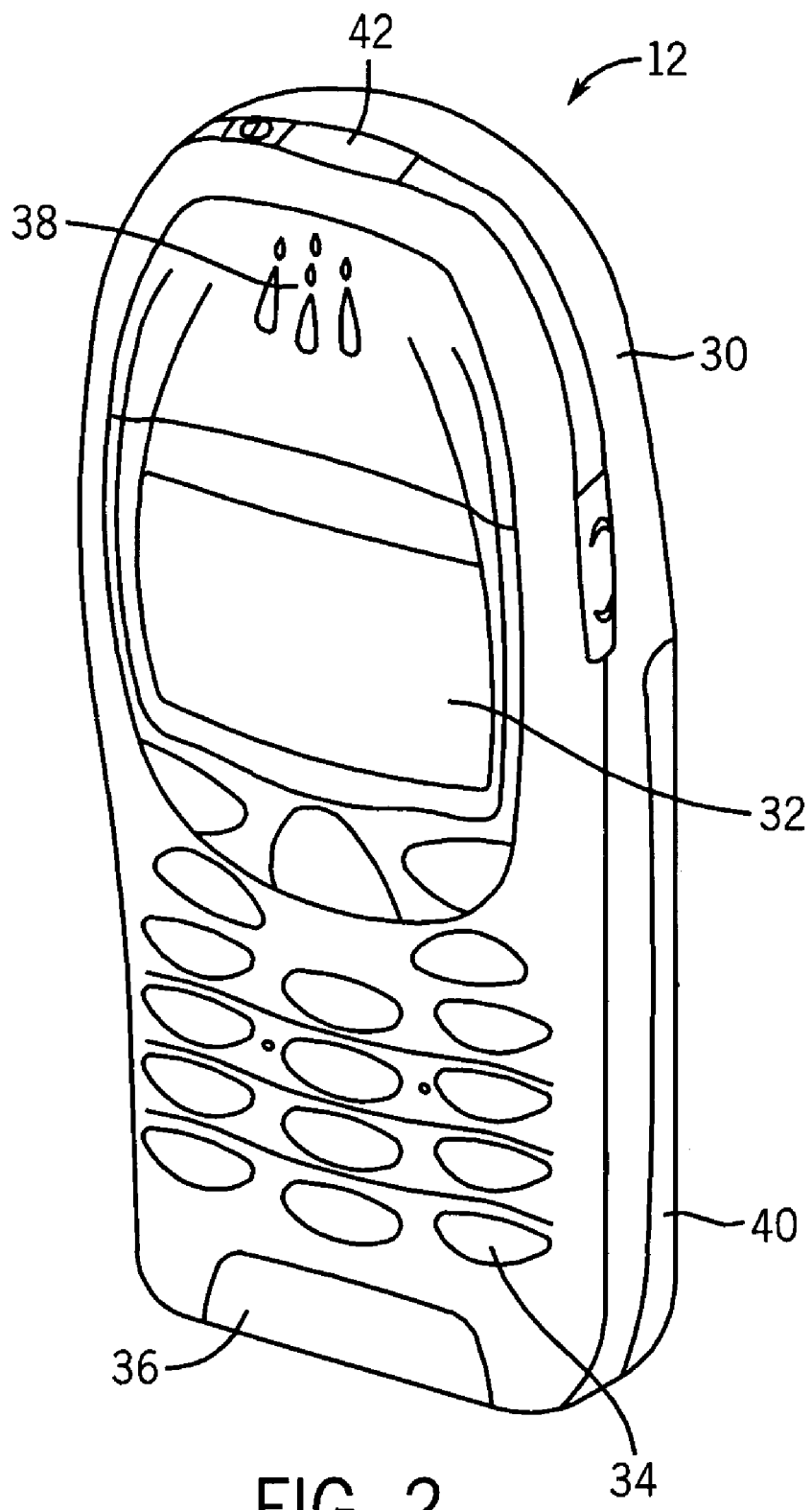
FIG. 2 is a perspective view of a mobile telephone that can be used in the implementation of the present invention.
Figure 3:
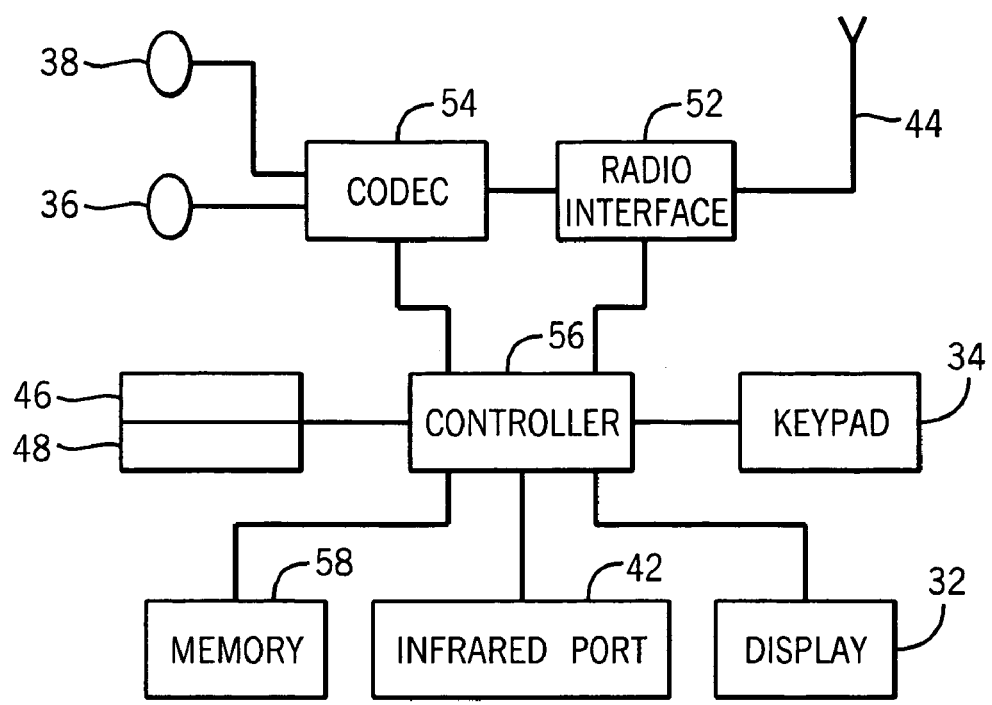
FIG. 3 is a schematic representation of the telephone circuitry of the mobile telephone of FIG. 2.

FIGS. 2 and 3 show one representative mobile telephone 12 within which the present invention may be implemented. It should be understood, however, that the present invention is not intended to be limited to one particular type of mobile telephone 12 or other electronic device. The mobile telephone 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

According to the principles of the present invention, among permissions defined in the OMA DRM specifications, only "execute" is applied to MIDlets. Any of the constraints (together or separately) defined in the OMA DRM specifications can be used in conjunction with the "execute" permission. Permission enforcement occurs generally as follows. Permissions and constraints are checked each time a MIDlet is launched. If execution rights are found to be invalid, a MIDlet is not permitted to be launched. In the event that execution rights expire while the MIDlet is still running, the MIDlet is closed and the user is notified with a special prompt. Alternatively and instead of having the application close, the user may also be provided with the option of requesting a new rights object. In this case, the applicaton is put into a paused state until rights arrive.

Figure 4:
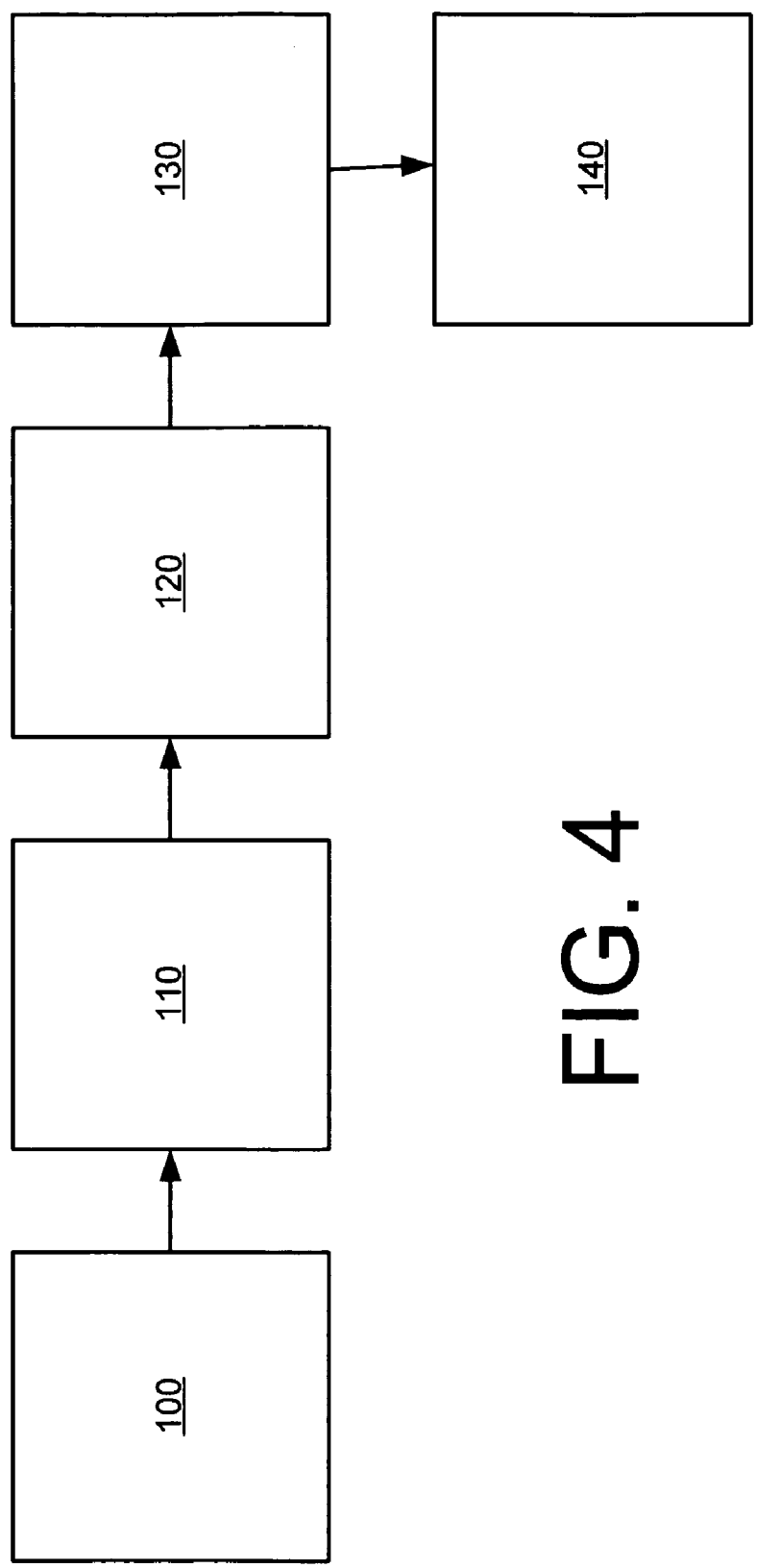
FIG. 4 is a flow chart showing the steps involved in the implementation of one embodiment of the present invention.

FIG. 4 is a flow chart showing the implementation of a permission enforcement mechanism according to one embodiment of the present invention. For permission enforcement, at step 100, permission and constraints are checked whenever a MIDlet is launched. If execution rights are invalid, then at step 110 the MIDlet is not permitted to be launched. If the execution rights are valid, then at step 120 the MIDlet launching is completed. On occasion, execution rights will expire while the MIDlet is still running. In this situation and at step 130, the user is notified with a special prompt and, at step 140, the application is closed. Alternatively, the application is closed at step 140 before any prompt is presented.

Figure 5:
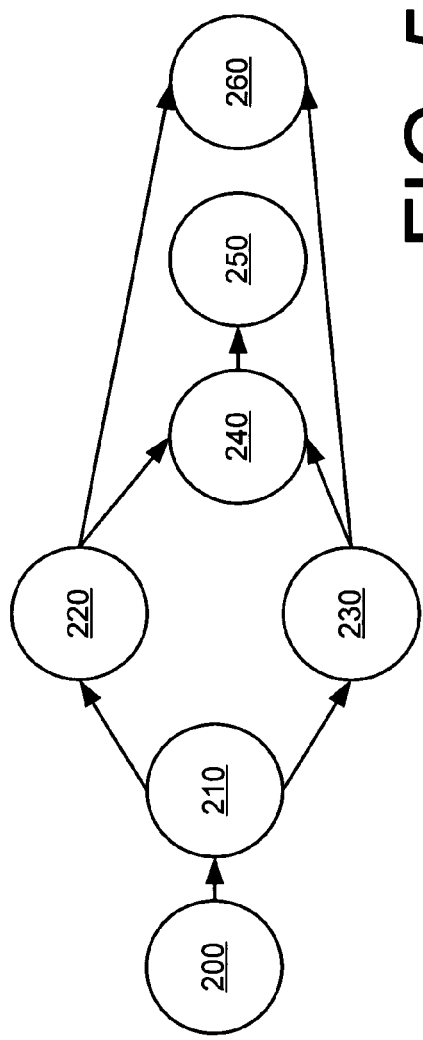
FIG. 5 is a first portion of a flow chart depicting a process by which running MIDlets are closed when execution rights become invalid according to one embodiment of the present invention.
Figure 6:
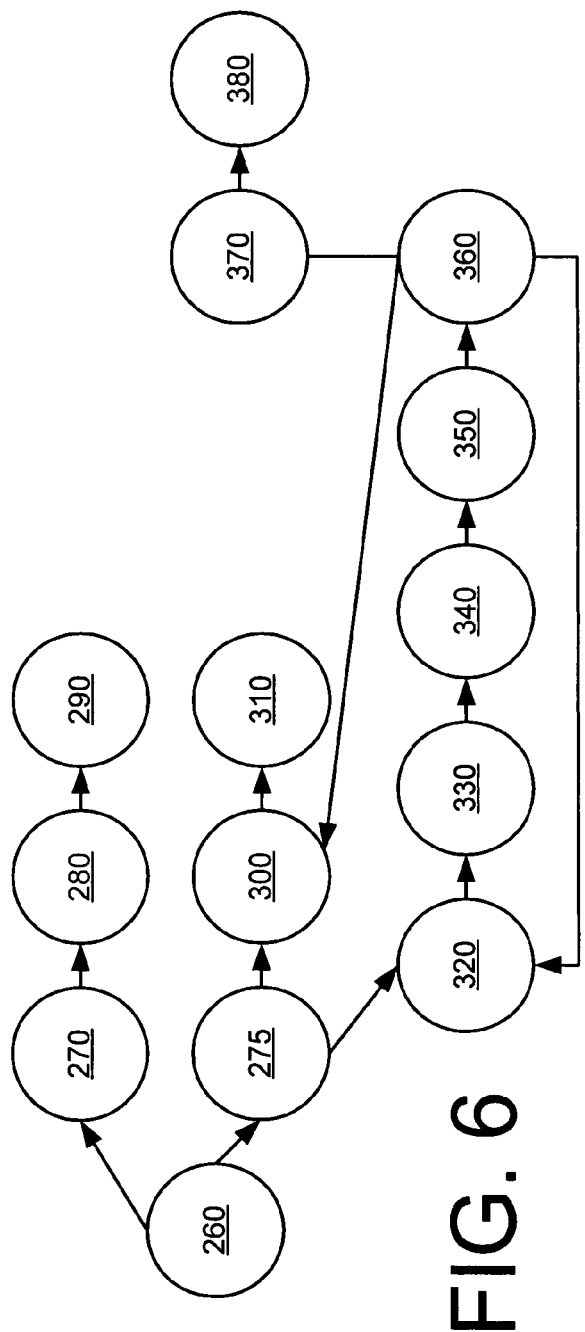
FIG. 6 is a second portion of a flow chart depicting a process by which running MIDlets are closed when execution rights become invalid according to one embodiment of the present invention.

FIGS. 5 and 6 are flow charts depicting a process by which running MIDlets are closed when execution rights become invalid. At step 200, the OMA DRM protected MIDlet is running. At step 210 and at some point in time, the execution rights become invalid. This can occur in two situations. In one situation, as time passes, either a <datetime> or an <interval> constraint makes the "execute" permission invalid. In the second situation, a <count> constraint becomes invalid. This can occur if the mobile terminal permits the user to switch between different applications. In terminals of this type, the <count> permission is decreased each time the user puts the MIDlet into the background. Alternatively, this permission can be decreased when the user brings it to the foreground. It should be noted that the <count> is not decreased if the MIDlet is put to the background by the terminal itself. This type of forced task switching can occur, for example, when the terminal receives an incoming phone call.

At step 220, the Java application manager (JAM) learns that the MIDlet's execution rights have expired by polling the DRM engine. Alternatively, at step 230 the DRM engine notifies the JAM that the MIDlet's execution rights have expired. When either steps 220 or 230 occur, the JAM learns that the running MIDlet needs to be closed. At step 240, if the MIDlet is not in the foreground when step 220 or 230 occurs, the MIDlet is brought to the foreground. If the MIDlet is already in the foreground when the JAM learns that the execution rights have expired, then the application proceeds to close at step 250.

If, when the closing begins, the MIDlet is displaying a Canvas-based screen, then at step 260 a Canvas.hideNotify( ) instruction is called to let the MIDlet know about the loss of control over the terminal display. A prompt can then be provided to the user indicating that execution rights are no longer active. The message can declare that "rights for this MIDlet expired," for example. If the MIDlet is protected using an OMA DRM forward-lock or combined delivery protection method, the prompt includes a single "Close" command at step 270 in FIG. 6. When the user selects this command at step 280, the MIDlet is closed at step 290. This is accomplished by having the JAM call the MIDlet.destroyApp(true) instruction. Alternatively, the closing can occur automatically without a "close" command being presented to the user. Once the application is closed, the user is notified about the closing. The user is then not permitted to launch any more MIDlets from the suite to which the closed MIDlet belongs.

On the other hand, if the MIDlet is protected using an OMA DRM separate delivery protection method, a prompt including two commands, "Get Rights" and "Close," is provided at step 275. If the user selects the "Close" prompt at step 300, the JAM closes the MIDlet at step 310 by calling the MIDlet.destroyApp(true) instruction. After this is completed, the user is not permitted to launch any more MIDlets from the suite to which the closed MIDlet belongs. However, the user is still capable of requesting additional rights for the suite.

If the user selects the "Get Rights" prompt at step 320, on the other hand, a browser on the terminal is opened and an attempt to contact the URL of the Rights Issuing Service for the particular MIDlet suite is made at step 330. If the attempt is successful, the user has an opportunity to request/buy a desired level of rights for the MIDlet suite at step 340. After rights are requested, or if some error has occurred, the user closes the browser at step 350. After the browser is closed, the initial prompt changes its appearance to state "Waiting for rights to arrive . . . " (or a similar message) and has two commands "Request Again" and "Close." This occurs at step 360. The "Request Again" command works in the same manner as "Get Rights." The "Close" command works in the same manner as the corresponding command in the initial prompt. If, as represented at step 370, the requested rights object arrives before the user selects either command, another prompt saying, "Rights have arrived, usage of application can continue" appears at step 380. At this point, all windows obscuring the MIDlet window disappear, and the MIDlet continues to run. If the MIDlet displays a Canvas-based screen, then a Canvas.showNotify( ) instruction is called to let the MIDlet know that it now controls the terminal's display. In each of these scenarios, the "close" function can also occur automatically, with options such as "Get Rights" being presented to the user after the application has been closed.

Implementation of the present invention requires integration between the JAM and the DRM engine software component. The JAM needs to be able to check execution rights whenever a DRM protected MIDlet is launched. In one embodiment of the present invention, the JAM also needs to poll the DRM engine while a MIDlet is running to ensure that rights are still valid. Alternatively, and as discussed above, the DRM engine may instead notify the JAM about expiration of execution rights. The JAM also contains a DRM-related user interface, such as the prompt shown to the user in cases where execution rights for a running MIDlet expire.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method, comprising:
    determining whether a mobile electronic device possesses valid execution rights for an application operating on the mobile electronic device,
    if the mobile electronic device possesses valid execution rights for the application, launching the application on the mobile electronic device;
    obtaining information that the valid execution rights for the application have expired after launching of the application; and
    in response to the expiration of the valid execution rights, closing the application.

2. The method of claim 1, further comprising providing a prompt to the user including an option for the user to obtain new valid execution rights, and wherein selection of the option by the user initiates an attempt to access a remote system where the user can obtain the new valid execution rights.

3. The method of claim 1, wherein the obtaining of information that the valid execution rights for the application have expired includes the step of having a Java application manager poll a digital rights management engine to determine whether the valid execution rights have expired.

4. The method of claim 1, wherein the obtaining of information that the valid execution rights for the application have expired includes the step of having a digital rights management engine inform a Java application manager that the valid execution rights have expired.

5. The method of claim 2, further comprising, if the application is not in a foreground of the electronic device when information is obtained that the valid execution rights for the application have expired, moving the application to the foreground before providing the prompt to the user.

6. The method of claim 1, further comprising the step of, if at the closing step the application is displaying a Canvas-based screen, providing an instruction to the application indicating a loss of control over a display on the mobile electronic device.

7. A computer program product, embodied on a computer-readable medium, comprising:
    computer code for determining whether a mobile electronic device possesses execution rights for an application operating on the mobile electronic device,
    computer code for, if the mobile electronic device possesses valid execution rights for the application, launching the application on the mobile electronic device;
    computer code for obtaining information that the valid execution rights for the application have expired after launching of the application; and
    computer code for, in response to the expiration of the valid execution rights, closing the application.

8. The computer program product of claim 7, further comprising computer code for providing a prompt to the user including an option for the user to obtain new valid execution rights, and wherein selection of the option by the user initiates an attempt to access a remote system where the user can obtain the new valid execution rights.

9. The computer program product of claim 7, wherein the obtaining of information that the valid execution rights for the application have expired includes computer code for having a Java application manager poll a digital rights management engine to determine whether the valid execution rights have expired.

10. The computer program product of claim 7, wherein the obtaining of information that the valid execution rights for the application have expired includes computer code for having a digital rights management engine inform a Java application manager that the valid execution rights have expired.

11. The computer program product of claim 8, further comprising computer code for, if the application is not in a foreground of the electronic device when information is obtained that the valid execution rights for the application have expired, moving the application to the foreground before providing the prompt to the user.

12. The computer program product of claim 7, further comprising computer code for, if at the closing step the application is displaying a Canvas-based screen, providing an instruction to the application indicating a loss of control over a display on the mobile electronic device.

13. A mobile electronic device, comprising:
    a processor for processing information; and
    a memory unit operatively connected to the processor, comprising:

computer code for determining whether a mobile electronic device possesses execution rights for an application, computer code for, if the mobile electronic device possesses valid execution rights for the application, launching the application on the mobile electronic device., computer code for obtaining information that the valid execution rights for the application have expired after launching of the application; and computer code for, in response to the expiration of the valid execution rights, closing the application.

14. The mobile electronic device of claim 13, wherein the computer program product includes computer code for providing a prompt to the user includes an option for the user to obtain new valid execution rights, and wherein selection of the option by the user initiates an attempt to access a remote system where the user can obtain the new valid execution rights.

15. The mobile electronic device of claim 13, wherein the obtaining of information that the valid execution rights for the application have expired includes computer code for having a Java application manager poll a digital rights management engine to determine whether the valid execution rights have expired.

16. The mobile electronic device of claim 14, wherein the computer program product further comprises computer code for, if the application is not in a foreground of the electronic device when information is obtained that the valid execution rights for the application have expired, moving the application to the foreground before providing the prompt to the user.

17. The mobile electronic device of claim 13, wherein the computer program product further comprises computer code for, if at the closing step the application is displaying a Canvas-based screen, providing an instruction to the application indicating a loss of control over a display on the mobile electronic device.

18. A module, comprising:
a processor for processing information; and
a memory unit operatively connected to the processor, comprising:
compute code for determining whether a mobile electronic device possesses execution rights for an application,
computer code for, if the mobile electronic device possesses valid execution rights for the application, launching the application on a mobile electronic device,
computer code for obtaining information that the valid execution rights for the application have expired after launching of the application; and
computer code for, in response to the expiration of the valid execution rights, closing the application.

19. The module of claim 18, wherein the computer program product includes computer code for providing a prompt to the user includes an option for the user to obtain new valid execution rights, and wherein selection of the option by the user initiates an attempt to access a remote system where the user can obtain the new valid execution rights.

20. The module of claim 18, wherein the obtaining of information that the valid execution rights for the application have expired includes computer code for having a Java application manager poll a digital rights management engine to determine whether the valid execution rights have expired.

* * * * *